US012261716B2

(12) United States Patent
Walrant et al.

(10) Patent No.: US 12,261,716 B2
(45) Date of Patent: Mar. 25, 2025

(54) CONTROLLER AREA NETWORK SYSTEM AND A METHOD FOR THE SYSTEM

(71) Applicant: NXP B.V., Eindhoven (NL)

(72) Inventors: Thierry G. C. Walrant, Bouge (BE); Georg Olma, Grasbrunn (DE); Karthik Sivaramakrishnan, Eindhoven (NL)

(73) Assignee: NXP B.V., Eindhoven (NL)

( * ) Notice: Subject to any disclaimer, the term of this patent is extended or adjusted under 35 U.S.C. 154(b) by 85 days.

(21) Appl. No.: 18/461,312

(22) Filed: Sep. 5, 2023

(65) Prior Publication Data

US 2024/0097935 A1 Mar. 21, 2024

(30) Foreign Application Priority Data

Sep. 21, 2022 (EP) ..................................... 22196969

(51) Int. Cl.
*H04L 12/40* (2006.01)
(52) U.S. Cl.
CPC .................. *H04L 12/40006* (2013.01); *H04L 2012/40215* (2013.01)
(58) Field of Classification Search
CPC ............... H04L 12/40006; H04L 2012/40215
See application file for complete search history.

(56) References Cited

U.S. PATENT DOCUMENTS

| 9,954,892 B2* | 4/2018 | Elend | H04L 12/40045 |
| 10,361,934 B2* | 7/2019 | Elend | H04L 12/40045 |
| 11,522,872 B2* | 12/2022 | Klösters | H04L 63/123 |
| 2018/0189483 A1* | 7/2018 | Litichever | G06F 13/36 |
| 2022/0070022 A1* | 3/2022 | van de Burgt | H04L 7/033 |
| 2022/0318178 A1* | 10/2022 | Elend | H04L 12/40176 |

FOREIGN PATENT DOCUMENTS

| EP | 3358803 A1 | 8/2018 |
| EP | 3926894 A1 | 12/2021 |

* cited by examiner

*Primary Examiner* — Henry Tsai
*Assistant Examiner* — Christopher A Daley (57) ABSTRACT

The present disclosure relates to a Controller Area Network (CAN) system including: a CAN device and a monitoring device. The CAN device includes a transmit data (TXD) interface, a transmitter, a CAN BUS interface, and a control unit. The control unit reads out an identifier from a TXD message and compares the identifier with a reference tag. The CAN device generates a CAN BUS signal based on the TXD message at the CAN BUS interface. The control unit, if the comparison indicates that the identifier does not correspond to the reference tag, invalidates a representation of the TXD message by the CAN BUS signal and temporarily prevents another CAN BUS signal from being generated by the CAN device at the CAN BUS interface. The monitoring device receives an instruction message over a CAN BUS network and, in response, tests for reachability other CAN devices on the CAN BUS network.

20 Claims, 6 Drawing Sheets

CONTROLLER AREA NETWORK SYSTEM AND A METHOD FOR THE SYSTEM

CROSS-REFERENCE TO RELATED APPLICATIONS

This application claims priority under 35 U.S.C. § 119 to European patent application no. 22196969.4, filed Sep. 21, 2022, the contents of which are incorporated by reference herein.

TECHNICAL FIELD

The present disclosure relates to a Controller Area Network, CAN, System and a Method for the CAN System.

BACKGROUND

CAN buses can be used for communications within vehicles, in particular within automobiles. It will be appreciated that CAN buses also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. A CAN protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

In accordance with a first aspect of the present disclosure, a Controller Area Network, CAN, system is provided. The CAN system comprising: a first CAN device, and a monitoring device, wherein the first CAN device comprises a first transmit data, TXD, interface, a first transmitter, a first CAN BUS interface, and a first control unit; wherein the first control unit is configured to read out a first identifier from a first TXD message and to compare, as a first comparison, the first identifier with at least one first reference tag; wherein the first CAN device is configured to generate a first CAN BUS signal based on the first TXD message via the first transmitter at the first CAN BUS interface, such that the first CAN BUS signal represents at least a first part of the first TXD message; wherein the first control unit is configured, if a result of the first comparison indicates that the first identifier does not correspond to any of the at least one first reference tag, to invalidate a representation of the first TXD message by the first CAN BUS signal and to prevent, for a predetermined first interruption time, a (preferably further) CAN BUS signal from being generated by the first CAN device at the first CAN BUS interface, and wherein the monitoring device is configured to receive an instruction message over a CAN BUS network from a second CAN device and to test for reachability to any CAN device coupled to the CAN BUS network in response to the instruction message.

In one or more embodiments, the CAN system comprises the CAN BUS network.

In one or more embodiments, the CAN system comprises the second CAN device.

In one or more embodiments, the second CAN device comprises a second transmitter, a second receiver, a second CAN BUS interface, and a second processing unit, wherein the second receiver is directly or indirectly coupled to the second CAN BUS interface to receive the first CAN BUS signal, wherein the second receiver is configured to transmit a second RXD signal to the second processing unit based on the first CAN BUS signal, wherein the second RXD signal represents at least a first part of a second RXD message, wherein the first part of the second RXD message including the first identifier of the first TXD message, wherein the second processing unit is configured to read the first identifier from the first part of the second RXD message and, as a second comparison, to compare the first identifier with a second reference tag, wherein the second processing unit is further configured, if the result of the second comparison indicates that the first identifier corresponds to the second reference tag, to control the second transmitter to generate with the second transmitter a second CAN BUS signal representing the instruction message, which indicates an unpermitted use of the first identifier.

In one or more embodiments, the monitoring device is configured to test the reachability to any CAN device coupled to the CAN BUS network in response to the received instruction message only if the instruction message directly or indirectly represents the unpermitted use of an identifier and/or a compromised network device and/or a compromised network node.

In one or more embodiments, the monitoring device comprises a third CAN BUS interface, a third receiver, a third transmitter and a third processing unit, wherein the third receiver is directly or indirectly coupled to the third CAN BUS interface to receive the second CAN BUS signal, wherein the third receiver is further configured to transmit a third RXD signal to the third processing unit based on the second CAN BUS signal, the third RXD signal representing the instruction message, wherein the third processing unit is configured to initiate a reachability test of the CAN devices coupled to the CAN BUS network by controlling the third transmitter in response to the received instruction message such that a CAN BUS test signal is generated by the third transmitter at the third CAN BUS interface for each CAN device, wherein each CAN BUS test signal represents a request for sending of a response message to the monitoring device.

In one or more embodiments, the first control unit of the first CAN device is configured to prevent reception of CAN BUS signals via the first CAN BUS interface during the first interruption time.

In one or more embodiments, the first control unit of the first CAN device is configured to interrupt a signal connection between the first CAN BUS interface and a first receiver of the first CAN device during the first interruption time.

In one or more embodiments, the first control unit of the first CAN device is configured to disable the first receiver during the first interruption time.

In one or more embodiments, the first control unit of the first CAN device is configured to prevent transmission of CAN BUS signals via the first CAN BUS interface during the first interruption time.

In one or more embodiments, the first control unit is configured to interrupt a signal connection between the first transmitter and the first CAN BUS interface during the first interruption time.

In one or more embodiments, the first control unit is configured to disable the first transmitter during the first interruption time.

In one or more embodiments, the first interruption time is predefined to send the CAN BUS test signal and/or response messages during the first interruption time.

In one or more embodiments of the CAN system, wherein each CAN device is configured, if the CAN BUS test signal is received via the associated CAN BUS interface and the associated receiver, to generate a digital RXD test signal based on the CAN BUS test signal at the associated receiver; wherein each CAN device is configured, if the RXD test signal is generated by the associated receiver, to read out the response request; wherein each CAN device is configured, if the response request is read out and if the transmitter of the respective CAN device is not disabled, to drive the transmitter for generating a CAN BUS response signal representing a response message that directly or indirectly indicates the respective CAN device; wherein each CAN device is configured, if the signal connection between the associated transmitter and the associated CAN BUS interface is not interrupted, to transmit the CAN BUS response signal generated by the associated transmitter via the associated CAN BUS interface; wherein the monitoring device is configured to receive the CAN BUS response signals caused by the instruction message resulting in a digital RXD response signal representing the response messages; and wherein the third processing unit is configured to identify a CAN device potentially malicious based on the received response messages.

According to a second aspect of the present disclosure, a method for a Controller Area Network, CAN, system is provided, wherein the CAN system comprising a first CAN device, and a monitoring device, wherein the first CAN device comprises a first transmit data, TXD, interface, a first transmitter, a first CAN BUS interface, and a first control unit, and wherein the method comprises the steps of: a) the first control unit reading out a first identifier from a first TXD message; b) comparing, as a first comparison, the first identifier with at least a first reference tag; c) the first transmitter generating, via the first CAN BUS interface, a first CAN BUS signal based on the first TXD message, such that the first CAN BUS signal represents at least a first portion of the first TXD message; d) both, invalidating a representation of the first TXD message by the first CAN BUS signal by means of the first control unit and preventing the first CAN BUS signal from being generated by the first CAN device at the first CAN BUS interface for a predetermined first interruption time by means of the first control unit, if a result of the first comparison of step b) indicates that the first identifier does not correspond to one of the at least one first reference tag; e) receiving an instruction message over the CAN BUS network at the monitoring device from a second CAN device; and f) testing a reachability from the monitoring device to each CAN device coupled to the CAN BUS network in response to the received instruction signal. It shall be noted, that step a) may be carried out before step b), or vice versa.

In accordance with a third aspect of the present disclosure, a computer program is provided, comprising executable instructions which, when executed by a processing unit, cause the processing unit being configured to carry out the method of the second aspect and/or one or more embodiments thereof.

DESCRIPTION OF DRAWINGS

Embodiments of the present disclosure will be described in more detail with reference to the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DESCRIPTION OF EMBODIMENTS

Figure 1:
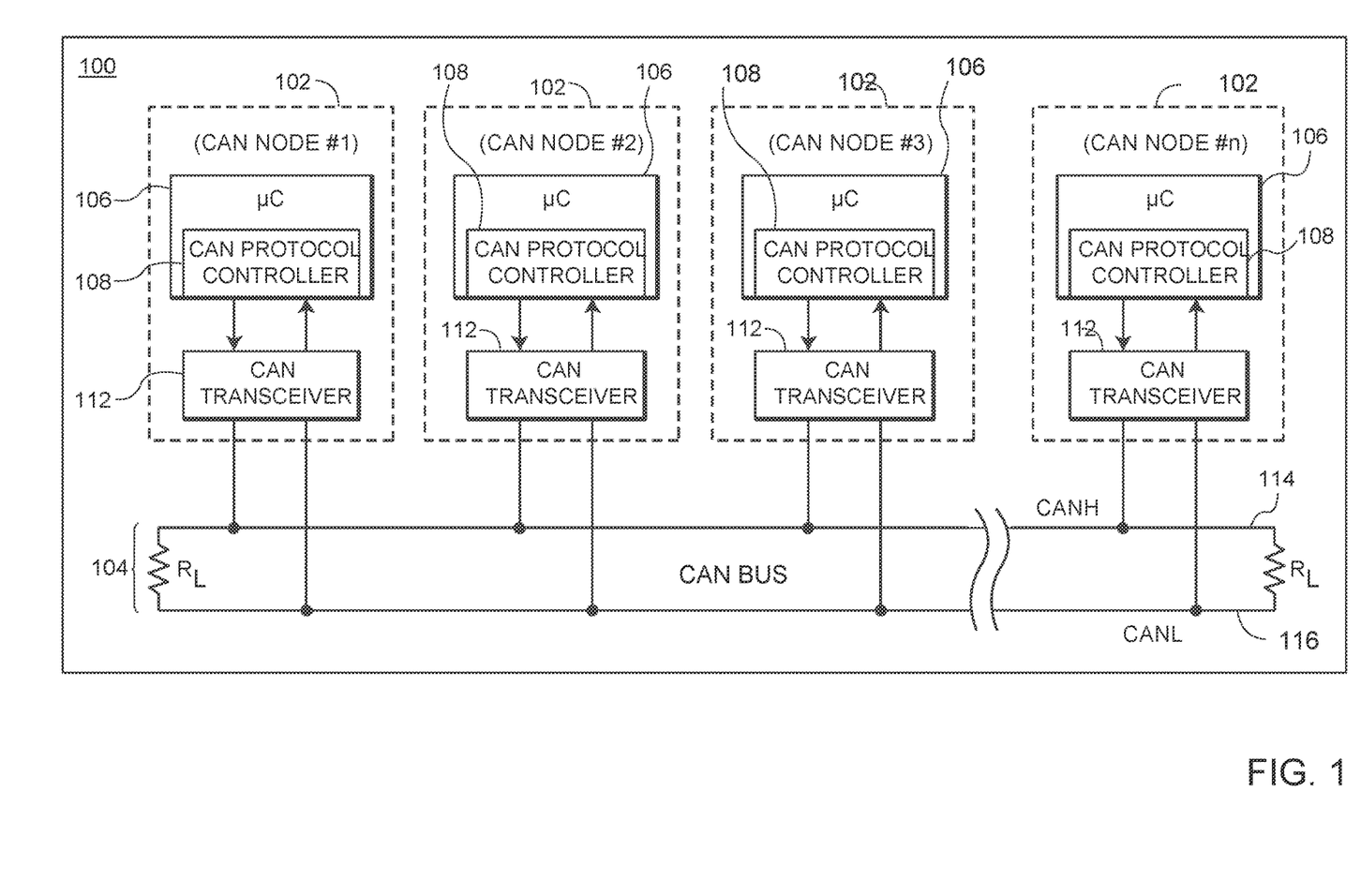
FIG. 1 shows a simplified block diagram of a CAN System.

FIG. 1 schematically depicts an example of a CAN system 100 that is known in the field. The CAN system may include multiple CAN nodes 102, also referred to as "ECUs," each connected to a CAN BUS network 104. In the embodiment of FIG. 1, each CAN node 102 includes a microcontroller 106 having an embedded CAN protocol controller 108 and a CAN transceiver 112. The CAN protocol controller 108 may be referred to as a CAN controller. The CAN transceiver 112 may be referred to as a transceiver.

The microcontrollers 106 are typically connected to at least one device (not shown) such as a sensor, an actuator, or some other control device and are programmed to determine the meaning of received messages and to generate appropriate outgoing messages. The microcontrollers 106, which may also be referred to as host processors, hosts or digital signal processors (DSPs), are known in the field. In an embodiment, the host supports application software that interacts with the CAN protocol controller 108.

The CAN BUS network 104 carries analog differential signals and includes a first CAN signal line 114, which is also referred to as the CAN high (CANH) bus line 114, and a second CAN signal line 116, which is also referred to as the CAN low (CANL) bus line 116. The CAN BUS network 104 is known in the field.

Figure 2:
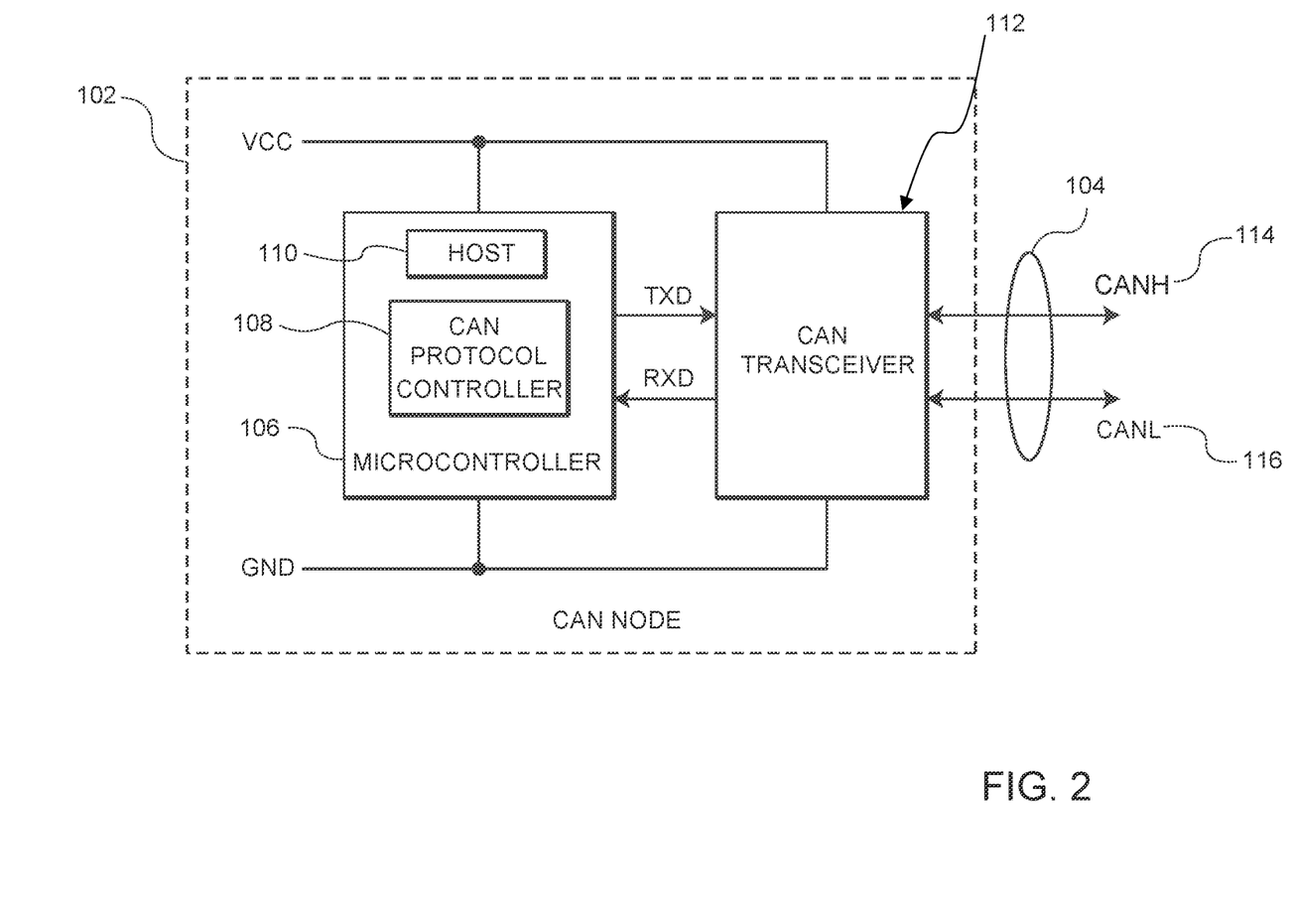
FIG. 2 shows a simplified block diagram of a CAN Node.

FIG. 2 depicts an expanded view of one CAN node 102 from FIG. 1. In the expanded view of FIG. 2, the microcontroller 106 includes a host 110, which may be, for example, a software application that is stored in a memory of the microcontroller 106 and executed by processing circuits of the microcontroller 106. The microcontroller 106 and the CAN transceiver 112 of the CAN node 102 are connected between a first supply voltage, VCC, and as second supply voltage, which is usually ground, GND. As illustrated in FIG. 2, data communicated from CAN protocol controller 108 being implemented by the microcontroller 106 to the CAN transceiver 112 is identified as transmit data (TXD) and data communicated from the CAN transceiver 112 to the CAN protocol controller 108 being implemented by the microcontroller 106 is referred to as receive data (RXD). Throughout the description, TXD is carried on a TXD path and RXD is carried on an RXD path. Messages can be communicated to and from the CAN BUS network 104 via the CANH and CANL bus lines 114 and 116, respectively.

The CAN protocol controller 108 is preferably embedded within the microcontroller 106, but may also be implemented external to the microcontroller 106 (e.g., a separate IC device). The data link layer operations between the CAN protocol controller 108 and the CAN transceiver 112 is known in the field.

For example, in receive operations, the CAN protocol controller 108 receives from the transceiver 112 a digital RXD signal via the RXD path. The RXD signal may represent an RXD message. The CAN protocol controller 108 may store the received RXD message. The RXD message complies with the standardized frame format of the CAN protocol.

In transmit operations, the CAN protocol controller 108 receives a TXD message from the microcontroller 106 and transmits a TXD signal, which represents the TXD message, via the TXD path to the CAN transceiver 112. The TXD message typically complies with the standardized frame format of the CAN protocol.

The CAN transceiver 112 is located between the CAN controller 108 and the CAN BUS network 104. The CAN transceiver 112 is configured to implement physical layer operations according to the CAN protocol as known in the field.

For example, in receive operations, a CAN transceiver 112 converts analog differential signals from the CAN BUS network 104 to the RXD signal that the CAN protocol controller 108 can interpret. The CAN transceiver 112 may also protects the CAN protocol controller 108 from extreme electrical conditions on the CAN BUS network 104, e.g., electrical surges.

In transmit operations, the CAN transceiver 112 can convert the TXD signal received via the TXD path from the CAN protocol controller 108 into analog differential signals that are sent over a CAN BUS interface 124 on the CAN BUS network 104. The CAN BUS interface is adapted to be connected to the first and second CAN BUS signal lines 114, 116.

As noted above, the CAN protocol controller 108 can be configured to support the normal mode or the flexible data rate mode. As used herein, "CAN normal mode" (also referred to as "CLASSICAL CAN mode") as well as "CAN FD mode" refer to frames that are formatted according to the ISO 11898-1 standard.

Figure 3:
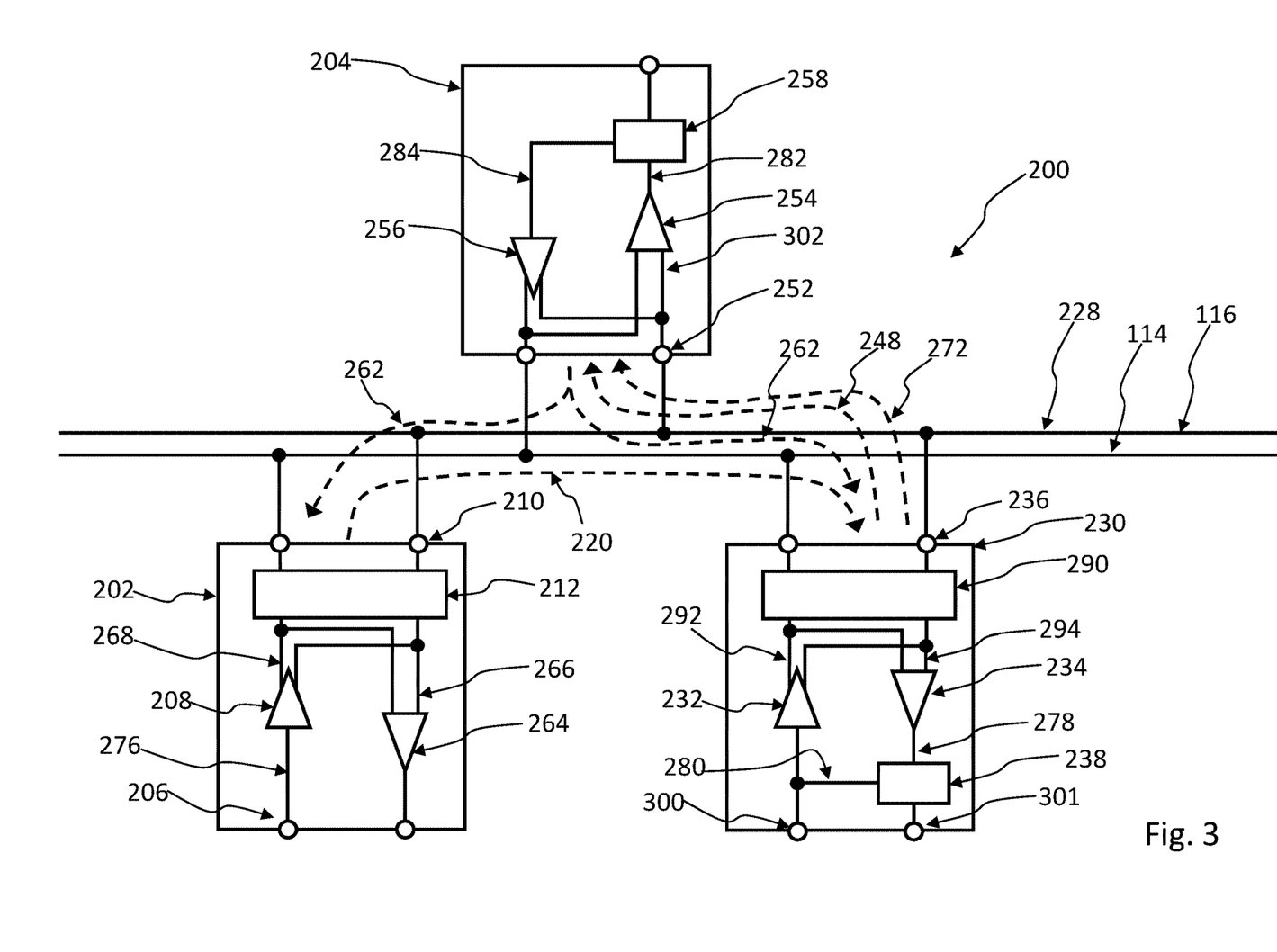
FIG. 3 shows a simplified block diagram of a CAN System according to the present disclosure.

FIG. 3 schematically illustrates an embodiment of the CAN system 200 according to the present disclosure. The CAN system 200 comprises a first CAN device 202 and a monitoring device 204. The first CAN device 202 comprises a first transmit data, TXD, interface 206. The first CAN device 202 also comprises a first transmitter 208, a first CAN BUS interface 210, and a first control unit 212.

The first CAN BUS interface 210 of the first CAN device 202 is configured to be connected to the CAN BUS 228. The CAN BUS 228 is also referred to as the CAN BUS network 228. In an example, the first CAN BUS interface 210 has two ports, each of the two ports being connectable to a different CAN BUS line 114, 116 of the CAN BUS network 228.

The first transmitter 208 of the first CAN device 202 may be directly or indirectly coupled to the first CAN BUS interface 210 via signal connections 268. In an example, the first control unit 212 may be coupled between the first transmitter 208 and the first CAN BUS interface 210 such that the first transmitter 208 is connected to the first CAN BUS interface 210 via the signal connections 268 and the first control unit 212. In principle, the first transmitter 208 may be configured to generate a CAN BUS signal, which can be transmitted via the first CAN BUS interface 210 to the CAN BUS network 228. The CAN BUS signal may be a differential voltage signal. The CAN BUS Signal is preferably a BUS Signal according to the CAN protocol.

The first CAN device 202 may receive a first TXD message 216 via the first TXD interface 206. Preferably, the first TXD message 216 is a digital TXD message. Further, the first TXD message 216 may be constructed and/or structured according to the CAN protocol. In an example, the first CAN device 202 includes a signal connection 276 extending from the first TXD interface 206 to the first transmitter 208. The signal connection 276 may be used to forward the first TXD message 216, if received via the first TXD interface 206, to the first transmitter 208.

The first control unit 212 of the first CAN device 202 is configured to read a first identifier from a first TXD message 216. The first transmitter 208 may be configured to generate a first CAN BUS signal 220 based on the first TXD message 216. In an example, the first transmitter 208 may generate the first CAN BUS signal 220, such that the first TXD message 216 is represented by the first CAN BUS signal 220. As another example, the first control unit 212 of the first CAN device 202 may be configured to read a first identifier from a first TXD message 216 being represented by the first CAN BUS signal 220. Thus, the first control unit 212 may be configured to receive and decode the first CAN BUS signal 220, such that the first control unit 212 may the read the first identifier from the first TXD message 216 derived from the decoded first CAN BUS signal 220. The first CAN BUS signal 220 generated by the transmitter 208 may be directed to the first CAN BUS interface 210 via the signal connections 268 and the first control unit 212, such that the first CAN BUS signal 220 is injected into the CAN BUS network 228. By the transmitter 208, the first CAN BUS signal 220 may be generated such that the first CAN BUS signal 220 represents the first TXD message 216. In an example, the first control unit 212 may be configured to decode the first CAN BUS signal 220 and read the first TXD message 216 from the decoded, first CAN BUS signal 220. The first TXD message 216 comprises an identifier that can be read out as a first identifier from the first TXD message 216 by means of the first control unit 212.

At least one first reference tag may be stored by the first CAN device 202. In an example, the at least one first reference tag is stored by the first control unit 212 of the first CAN device 202. Each first reference tag may have the form and/or structure of an identifier. Preferably, each first reference tag is pre-defined. Each first reference tag may represent an identifier permissibly usable by the first CAN device 202, the first TXD message 126 and/or the first CAN BUS signal 220. For example, each first reference tag may represent a permissible identifier that may be permissibly included in the first TXD message 216 represented by the first CAN BUS signal 220. If a first TXD message 216 may be received from the first CAN device 202 via the first TXD interface 206, wherein the first transmitter 208 generates the first CAN BUS signal 220 based on the first TXD message 216, and wherein the first TXD message 216 may be derived from the first TXD signal or from the first CAN BUS Signal 220, the at least one first reference tag may be used at the first control unit 212 to verify whether the identifier included in the first TXD message 216 matches a permissible identifier (represented by a first reference tag). If a matching, permissible identifier is found for the first identifier included in the first TXD message 216, it is permissible for the first CAN device 202 to send the first CAN BUS signal 220 that fully represents the first TXD message 216. However, if no suitable, permissible identifier is found for the first identifier included in the first TXD message 216, it may be inferred that the first identifier included in the first TXD message 216 is impermissible for the first CAN device 202, the first TXD message 216 and/or the first CAN BUS signal 220. This may mean that the first CAN device 202 may not generate a first CAN BUS signal 220 based on this first TXD message 216 that fully represents the first TXD message 216. In the case where no matching, permissible identifier is found for the first identifier included in the first TXD message 216, it may be assumed that the first TXD message 216 is an invalid message that may have been sent to the first CAN device 202 by a potentially malicious and/or compromised device. By not having the first TXD message 216 including an illegitimate identifier fully represented by the first CAN BUS signal 220, potential subsequent issues in the CAN BUS network 228, in the monitoring device 204 and/or in a further CAN device 230 can be prevented. This is because these further devices do not receive the corresponding first TXD message 216 via the first CAN BUS signal 220, if the first TXD message 216 includes an impermissible first identifier.

At least one first reference tag may be stored by the first CAN device 202, and preferably by the associated first control unit 212. In an example, multiple first reference tags are stored by the first CAN device 202, and preferably by the associated first control unit 212. Each first reference tag may represent exactly one permitted identifier, or a group of a plurality of permitted identifiers. In an example, a first reference tag may represent an identifier mask that captures a plurality of permitted identifiers. If a plurality of first reference tags is provided, each reference tag may represent an associated identifier mask. The plurality of identifier masks may capture different permitted identifiers. Therefore, at least one permissible identifier or a plurality of permissible identifiers may be defined via the at least one first reference tag. Preferably, each first reference tag is predefined.

The first control unit 212 of the first device 202 is configured to compare, as a first comparison, the first identifier from the first TXD message 216 with the at least one first reference tag.

The first CAN device 202 is configured to generate the first CAN BUS signal 220 based on the first TXD message 216 via the first transmitter 208 at the first CAN BUS interface 210, such that the first CAN BUS signal 220 represents at least a first part 222 of the first TXD message 216. Preferably, the first TXD message 216 is a digital TXD message such that the bits of the first TXD message 216 arrive at the transmitter 208 sequentially. Corresponding to the sequence of incoming bits, the transmitter 208 may generate the first CAN BUS signal 220, such that in an example, the transmitter 208 begins generating the first CAN BUS signal 220 before the transmitter 208 has fully received the first TXD message 216. In an example, the first TXD message 216 may include an impermissible first identifier. Due to the sequential transmission of the bits of the first TXD message 216 to the first transmitter 208, the first transmitter 208 in this example may have already begun generating the first CAN BUS signal 220 based on the bits of the first TXD message 216 that have already been received. Corresponding to the sequential transmission of the bits of the first TXD message 216 to the transmitter 208, the first TXD message 216 may also be transmitted and/or represented sequentially via the first CAN BUS signal 220. Therefore, at the first CAN BUS interface 210, a first part 222 of the first TXD message 216 may have already been transmitted and/or represented by the first part 223 of the first CAN BUS signal 220 before the first control unit 212 has read the first identifier from the first part 222 of the first TXD message 216, which is represented by the first part 223 of the CAN BUS signal. Only after the first control unit 212 has compared the first identifier with the at least one first reference tag and after the first control unit 212 has determined that the first identifier is impermissible, the first control unit 212 may initiate actions to prevent the first CAN BUS signal 220 from representing the full first TXD message 216. Therefore, the first control unit 212 is configured, if a result of the first comparison indicates that the first identifier does not correspond to any of the at least one first reference tags, to invalidate a representation of the first TXD message 216 by the first CAN BUS signal 220 and to prevent a (preferably further) CAN BUS signal from being generated (preferably at all) by the first CAN device 202 at the first CAN BUS interface 210 for a predetermined first interruption time 224.

In an example, the first identifier may not correspond to any of the at least one first reference tag if the first identifier does not correspond to any identifier represented and/or captured by the at least one reference tag. For example, the result of the first comparison may indicate that the first identifier is not represented and/or captured by any of the first reference tags. In this case, the first identifier is an impermissible first identifier. In another example, the result of the first comparison may indicate that the first identifier is represented and/or captured by at least one first reference tag. In this case, the first identifier is an permitted, first identifier.

Various possibilities exist to invalidate the representation of the full first TXD message 216 by the first CAN BUS signal 220. FIG. 3 schematically illustrates an example of the first CAN device 202, in which example the first control unit 212 is coupled between the first transmitter 208 and the first CAN BUS interface 210. To invalidate the representation of the first TXD message 216 by the first CAN BUS signal 220, the control unit 212 may interrupt the signal connection between the first transmitter 208 and the first CAN BUS interface 210 before the first TXD message 216 is fully represented by the first CAN BUS signal 220. Further, following the interruption, the control unit 212 may generate an error CAN BUS signal at the first CAN BUS interface 210, where the error CAN BUS signal representing an error frame, preferably according to the CAN protocol. With the error frame sent, any other device connected to the CAN BUS network 28 will understand that the first part 222 of the first TXD message 216, already represented via the first part 223 of the first CAN BUS signal 220, is invalid. In principle, however, there are other ways for the first control unit 212 to invalidate the representation of the first TXD message 216 by the first CAN BUS signal 220. For example, the first control unit 212 may feed the error frame in digital form to the first transmitter 208 and simultaneously disconnect the signal connection 276 before the first TXD message 216 has been fully transmitted to the first transmitter 208. The first transmitter 208 will integrate the error frame into the first CAN BUS signal 220. The error frame is also recognized by all devices connected to the CAN BUS network 228 and understood in such a way that the first part 222 of the TXD message 216, which was already represented by the first part 223 of first CAN BUS signal 220, is invalid.

In an example, if a CAN BUS signal is transmitted via the CAN BUS network 228, where the CAN BUS signal represents a CAN message, it is often not possible to determine from the CAN message which device has sent the CAN message or the respective CAN BUS signal. If a representation of a CAN message by the CAN BUS signal is invalidated due to an error frame being sent, it is therefore also not possible to determine from the invalidated representation of the CAN message by the CAN BUS signal which device has sent the CAN BUS signal.

The first control unit 212 is configured, after a representation of the first TXD message 216 by the first CAN BUS signal 220 has been invalidated, to subsequently prevent a (further) CAN BUS signal from being generated by the first CAN device 202 at the first CAN BUS interface 210 for a predetermined first interruption time 224. The first interruption time 224 provides an opportunity for testing a reachability of each CAN device 202, 230 coupled to the CAN BUS network 228. The monitoring device 204 of the CAN system 200 may be used to test the reachability. During the interruption time 224, the first CAN device 202 may not respond to any requests via the CAN BUS network 228 with a corresponding CAN BUS signal. As a result of the missing response, the first CAN device 202 may be detected.

The monitoring device 204 of the CAN system 200 is configured to receive an instruction message over the CAN BUS network 228 from the second CAN device 230. The monitoring 204 is also configured to test a reachability of each CAN device 202, 230 coupled to the CAN BUS network 228 in response to the received instruction message.

Previously, it was explained that the first control unit 212 may invalidate a representation of a first TXD message 216 by the first CAN BUS signal 220 if the first identifier of the first TXD message 216 is impermissible. Directly after the first control unit 212 has detected the impermissible first identifier, the first control unit 212 may start with the invalidation. In parallel or directly thereafter, the first control unit 212 may ensure for the first interruption time 224 that no CAN BUS signal is generated by the first CAN device 202 at the first CAN BUS interface 210. During this interruption time 224, the first CAN device 202 cannot send a message, and in particular not the instruction message to the monitoring device 204 via the CAN BUS network 228. However, the instruction message may be sent from the second CAN device 230 to the monitoring device 204 via a corresponding CAN BUS signal 248 representing the instruction message. In an example, the second device 230 may also detect whether a first CAN BUS signal 220 received by the second CAN device 230 represents a first part 222 of a first TXD message 216 that includes an impermissible identifier. In this case, the second CAN device 230 may trigger sending the instruction message to the monitoring device 204, preferably via a second CAN BUS signal 248.

After the monitoring device 204 receives the instruction message, the monitoring device 204 may test the reachability of the first CAN device 202 and the second CAN device 230 (and any other CAN device coupled to the CAN BUS network 228, if applicable) in response to the received instruction message. The first CAN device 202 will not be able to respond during the interruption time 224. The lack of response from the first CAN device 202 allows the monitoring device 204 to determine that the first CAN device 202, or any other device coupled to the first CAN device 202, is potentially malicious. As a result, it can therefore be determined which CAN device 202 is potentially malicious (directly or indirectly) and requires analysis.

In the example of the first CAN device 202 of FIG. 3, the first transmitter 208 and the first control unit 212 are shown as separate units. However, it is also possible that the first transmitter 208 and the first control unit 212 are completely or partially integrally designed. In this way, a compact design for the first CAN device 202 can be achieved.

In an example, the first CAN device 202 may be configured as a first CAN transceiver 112. In another example, the first CAN device 202 may include the first CAN transceiver 112 and a first CAN controller 108. Further, in another example, the first CAN device 202 may be configured as a first CAN node 102. If the first CAN device 202 comprises the first CAN controller 108 or if the first CAN device 202 is configured as a first CAN node 102, the first control unit 212 may be disposed in either the first CAN transceiver 212 or the first CAN controller 108. It is also possible that the first control unit 212 in the aforementioned example is distributed over the first CAN transceiver 112 and the first CAN controller 108.

Controller area network (CAN) BUS is a message-based communications BUS protocol that is often used within automobiles. The CAN BUS protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol is extended to provide higher data rates. The extended protocol, referred to as CAN Flexible Data-Rate or "CAN FD," is moving towards standardization in the form of an update of the existing ISO 11898-1 standard.

Figure 4:
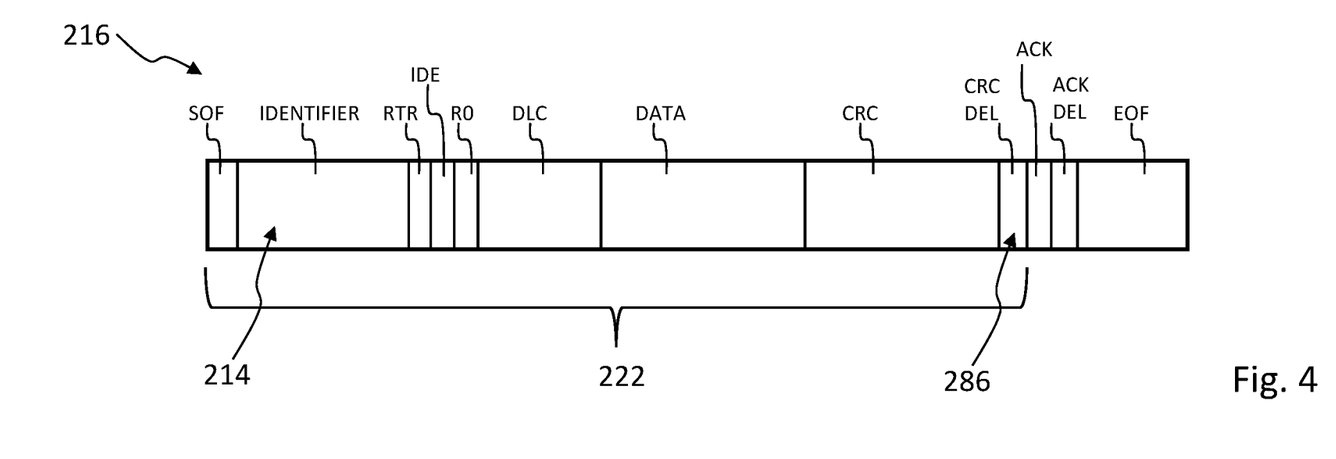
FIGS. 4 and 5 show simplified diagram of CAN messages.

FIG. 4 schematically illustrates an example of the first TXD message in the format of an ISO 11898-1 frame (in the classical base frame format (CBFF)). The fields are defined as follows:
  SOF Start of Frame (always dominant)
  IDENTIFIER Identifier Bits, defining the message content
  RTR Remote transmission Request
  IDE ID Extension
  r0 Reserved Bit 0 (replaced by FDF in the CAN FD format)
  DLC Data Length Code
  Data Data Bytes
  CRC Cyclic Redundancy Check
  CRC Del CRC Delimiter (always recessive)
  ACK Acknowledge
  ACK Del Acknowledge Delimiter
  EOF End Of Frame CAN messages are broadcast messages. The CAN protocol controllers 108 of the receiving CAN nodes 102 usually have identifier filters that are "tuned" to certain identifiers to make sure that the host receives relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The 29-bit IDENTIFIER field is preferably divided into two sections, an 11-bit base IDENTIFIER field and an 18-bit extended IDENTIFIER field.

The first TXD message 216, as schematically illustrated in FIG. 4, comprises an identifier field 214, in which the first identifier of the first TXD message 216 may be represented. Preferably, the first part 222 of the first TXD message 216 extends from the first field (SOF) to at least including the identifier field 214. Preferably, the first part 222 of the first TXD message 216 extends from the first field (SOF) to at least including the CRC delimiter field 286.

Figure 6:
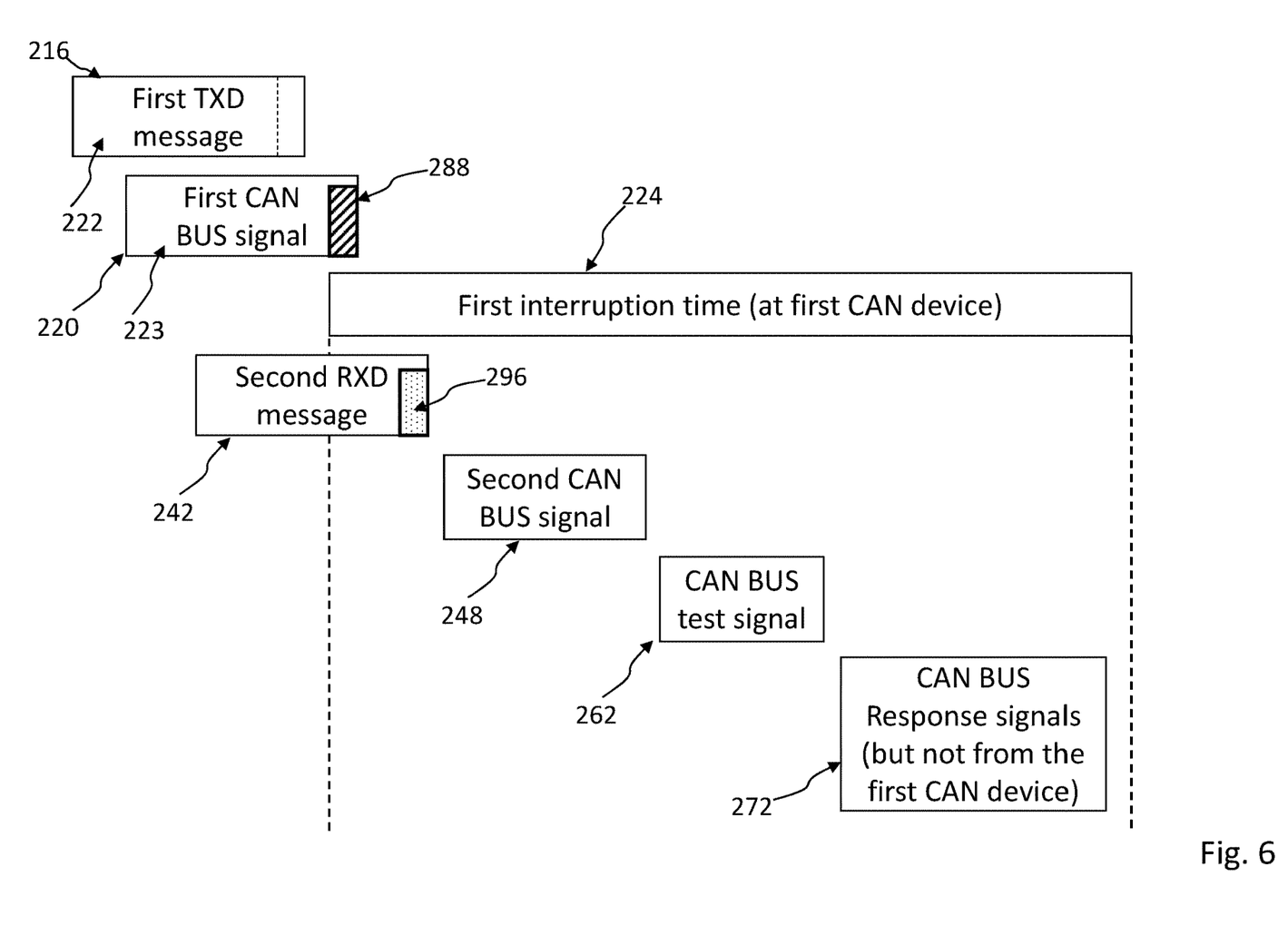
FIG. 6 shows a simplified event diagram.

FIG. 6 schematically illustrates an event diagram of messages and CAN BUS signals. The time runs horizontally from left to right. The first temporal event that occurs is the first TXD message 216. The bits of the first TXD message 216 are sequentially transmitted to the first receiver 208 of the first CAN device 202, and based on the bits of the first TXD message 216, the first receiver 208 begins (often somewhat delayed) to generate the first CAN BUS signal 220. There may be a possibly time gap between the start of the first TXD message 216 and the start of the first CAN BUS signal 220.

In the schematic diagram of FIG. 6, the first CAN BUS signal 220 comprises a first part 223 corresponding to the first part 222 of the first TXD message 216. The first control unit 212 is configured, if it is determined by the first comparison that the first identifier of the first TXD message 216 is impermissible, to invalidate the representation of the first TXD message 216 by the first CAN BUS signal 220. In this case, the first control unit 212 may cause an error frame 288 to be generated and represented by a corresponding CAN BUS signal sent via the first CAN BUS interface 210. According to the CAN protocol, the error frame 288 may comprise and/or be formed by at least six consecutive dominant bits. The dominant bits of the error frame 288 overwrite a second part of the first CAN BUS signal 220. The transmission of the error frame 288 invalidates the representation of the first TXD message 216, because the transmission of the error frame 288 occurs before the first CAN BUS signal 220 has fully represented the first TXD message 216.

At the same time that the error frame 288 is emitted, the first interruption time 224 may begin. During the first interruption time 224, the first control unit 212 prevents a (preferably further) CAN BUS signal from being generated by the first CAN device 202 at the first CAN BUS interface 210.

In an example, the CAN system 200 includes the CAN BUS network 228, and the first CAN BUS interface 210 of the first device 202 may be connected to the CAN BUS network 228. Further, a third CAN BUS interface 252 of the monitoring device 204 may be connected to the CAN BUS network 228.

In an example, the CAN system 200 includes the second CAN device 230, and a second CAN BUS interface 236 of the second CAN device 230 may be connected to the CAN BUS network 228. An example of the second CAN device is schematically illustrated in FIG. 3.

The second CAN device 230 may include a second transmitter 232, a second receiver 234, the second CAN BUS interface 236, and a second processing unit 238. At this point, it should be noted that the term "second" has been used with respect to the second processing unit 238 to unambiguously name that processing unit 238. However, the term "second" does not require that a first processing unit be present. The term "second" just as the other numerical words are used solely for distinguishing purpose.

To receive the first CAN BUS signal 220, the second receiver 234 of the second CAN device 230 is preferably directly or indirectly coupled to the second CAN BUS interface 236. In an example, the second receiver 234 may be directly or indirectly coupled to the second CAN BUS interface 236 via the signal connections 294. However, it is also possible that the second receiver 234 is coupled to the second CAN BUS interface 236 via the signal connections 294 and a second control unit 290. Provided that the second CAN device 230 is connected to the CAN BUS network 228 via the associated, second CAN BUS interface 236, the first CAN BUS signal 220 may be transmitted from the first CAN device 202 to the second CAN device 230 via the CAN BUS network 228. From the second CAN BUS interface 236, the first CAN BUS signal 220 may be forwarded to the second receiver 234.

Figure 5:
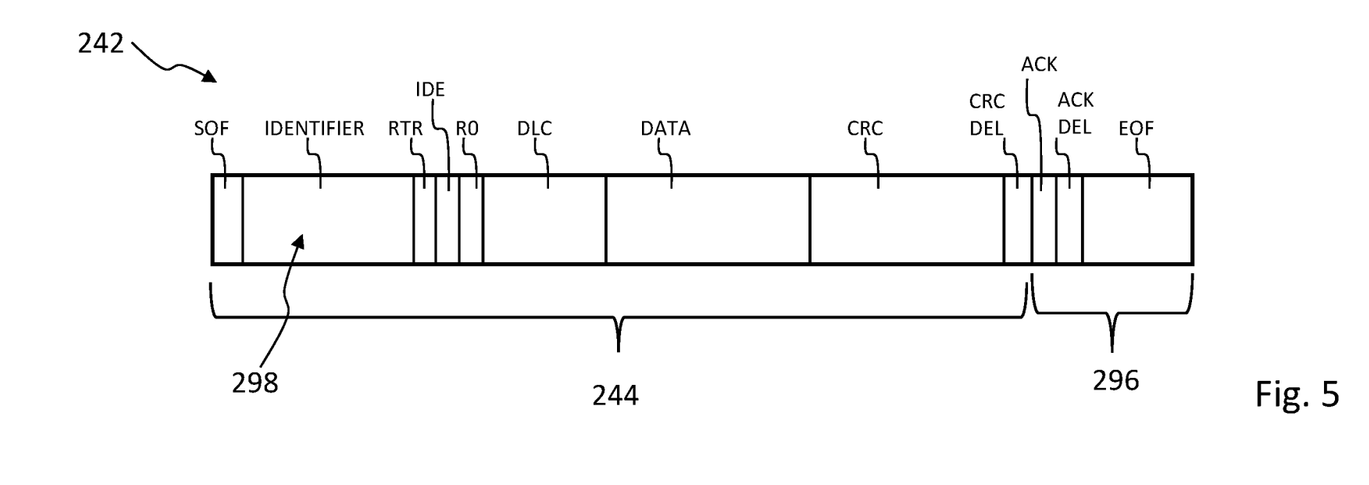

The second receiver 234 of the second CAN device 230 is configured to generate a second RXD signal based on the first CAN BUS signal 220. The first CAN BUS signal 220 is generated by the first CAN device 202. Previously, it was explained that the first CAN BUS signal 220 may only represent a first part 222 of a first TXD message 216 if the first TXD message 216 includes an impermissible first identifier in the associated identifier field 214. If the first CAN BUS signal 220 represents only the first part 222 of the first TXD message 216, it results that the second RXD signal represents from the first TXD message 216 not more than the first part 222 of the first TXD message 216. It should be noted, however, that the first part 222 of the first TXD message 216 comprises the first identifier of the first TXD message 216. In an example, the second receiver 234 is configured to decode the first CAN BUS signal 220 according to the CAN protocol to generate the second RXD signal representing a second RXD message 242. FIG. 5 schematically shows a structure of an example of the second RXD message 242. If the first CAN BUS signal 220 only represents the first part 222 of the first TXD message 216, the second receiver 234 will also decode only the corresponding first part 223 of the first CAN BUS signal 220 such that a first part 244 of the second RXD message 242 corresponds to the first part 222 of the first TXD message 216. In an example, the second receiver 234 may be configured to reconstruct a second part 296 of the second RXD message 242 based on the first part 244 of the second RXD message 242. The first part 244 and the second part 296 may together form the complete second RXD message 242.

As previously explained, the second receiver 234 of the second CAN device 230 is configured to generate the second RXD signal based on the first CAN BUS signal 220 at least such that the second RXD signal represents at least the first part 244 of the second RXD message 242. Preferably, the second RXD signal is a digital signal. The first part 244 of the second RXD message 242 includes the first identifier of the first TXD message 216. In an example, the identifier field 214 of the first TXD message 216 and the identifier field 298 of the second RXD message 242 represent the same, first identifier.

The second receiver 234 may be configured to transmit the second RXD signal to the second processing unit 238. In an example, a signal connection 278 may be formed between the second receiver 234 and the second processing unit 238 through which the second RXD signal may be transmitted from the second receiver 234 to the second processing unit 238. The second processing unit 238 may be configured to read the first identifier from the first part 244 of the second TXD message 242. The second processing unit 238 may be partially or fully integrated with the second control unit 290. However, the second processing unit 238 may also be designed separately from the second control unit 290.

At least one second reference tag may be stored by the second CAN device 230. In an example, the at least one second reference tag is stored by the second processing unit 238 of the second CAN device 230. Each second reference tag may have the form and/or structure of an identifier. Preferably, each second reference tag is predefined. Each second reference tag may represent an identifier that is impermissible except for the second CAN device 230. In other words, each second reference tag may represent an identifier that must not be included in a second RXD message 242.

In an example, the second CAN device 230 may include a second TXD interface 300 to receive a second TXD message via the second TXD interface 300. The second TXD message may have an associated identifier. In an example, each second reference tag may represent an permissible identifier for the second TXD message. Thus, the second TXD messages alone may permissibly use an identifier represented by the at least one second reference tag.

At least one second reference tag may be stored by the second CAN device 230, and preferably by the associated second processing unit 238. In an example, multiple second reference tags are stored by the second CAN device 230, and preferably by the associated second processing unit 238. Each second reference tag may represent exactly one identifier or a group of a plurality of identifiers. In an example, a second reference tag may represent an identifier mask that captures a plurality of identifiers. If a plurality of second reference tags are provided, each reference tag may represent an associated identifier mask. The plurality of identifier masks may capture different permitted identifiers. Therefore, at least one identifier or a plurality of identifiers may be defined via the at least one second reference tag. Preferably, each second reference tag is predefined.

The at least one second reference tag may be used by the second processing unit 238 of the second CAN device 230 to check whether the (first) identifier included in the second RXD message 242 matches an impermissible identifier (represented by a second reference tag). If a matching impermissible identifier is found for the (first) identifier included in the second RXD message 242, then the second RXD message 242, the first CAN BUS signal 220 and/or the first TXD message 216 may be determined by the second processing unit 238 as impermissible. Furthermore, in this case, the first CAN device 203 and/or a device connected to the first CAN device may be considered as malicious and/or compromised.

However, if no matching impermissible identifier (based on the at least one second reference tag) is found for the first identifier included in the second RXD message 242, it may be inferred that the first identifier included in the second RXD message 242 is permissible and may be forwarded within the second CAN device to a second RXD interface 301.

The second processing unit 238 is configured to read the first identifier from the first part 244 of the second RXD message 242 and, as a second comparison, compare the first identifier with the at least one second reference tag. The second processing unit 238 is also configured, if the result of the second comparison indicates that the first identifier (from the first part 244 of the second RXD message 242) matches at least one second reference tag, to control the second transmitter 232 of the second CAN device 230 such that the second transmitter 232 generates a second CAN BUS signal 248 representing the instruction message. Preferably, the instruction message represents an improper use of the first identifier. In an example, the first identifier (from the first part 244 of the second RXD message 242) matches a second reference tag if the first identifier matches and/or corresponds with an identifier represented by the second reference tag. The second processing unit 238, via the second transmitter 232, causes the instruction message to be sent in the event that the first identifier was improperly used. In an example, the second CAN device 230 is not prevented from generating a CAN BUS signal at the second CAN BUS interface 236 during the first interruption time 224 (which is preferably exclusively a first interruption time 224 for the first CAN device 202). Thus, it is possible via the second CAN device 230 to report the impermissible use of the first identifier to the monitoring device 204 via the instruction message.

As previously explained, the monitoring device 204 is configured to test the reachability of each CAN device 202, 230 connected to the CAN BUS network 228 in response to a received instruction message. In the example previously explained, the second CAN device 230 will be able to respond to the reachability test. However, the first CAN device 202 is prevented from generating a CAN BUS signal at the first CAN BUS interface 210 during the first interruption time 224, such that the first CAN device 202 cannot respond to the reachability test of the monitoring device 204. The monitoring device 204 may be configured to infer from the lack of response that the corresponding CAN device is potentially malicious and/or compromised.

In an example, the monitoring device 204 may be configured to test the reachability of each CAN device 202, 230 coupled to the CAN BUS network 228 in response to the received instruction message only if the instruction message directly or indirectly represents the impermissible use of an identifier and/or a compromised device 202, 230 and/or a compromised node 102. This may prevent the monitoring device from performing a high number of tests.

In an example, the monitoring device 204 includes a third CAN BUS interface 252, a third receiver 254, a third transmitter 256, and a third processing unit 258. The third receiver 254 is preferably directly or indirectly coupled to the third CAN BUS interface 252. Preferably, signal connections 302 extend from the third CAN BUS interface 252 to the third receiver 254. The second CAN BUS signal 248 may be transmitted from the second CAN device 230 to the third CAN BUS interface 252 of the monitoring device 204 via the CAN BUS network 228, wherein the second CAN BUS signal 248 may be forwarded from the third CAN BUS interface 252, preferably via the signal connections 302, to the third receiver 254. In an example, the third receiver 254 is configured to decode a CAN BUS signal. Preferably, the third receiver 254 is configured to generate a third RXD signal based on the received, second CAN BUS signal 248. The third RXD signal may then represent the instruction message. Further, the third RXD signal is a digital signal.

The third RXD signal generated by the third receiver 254 may be transmitted to the third processing unit 258 via the signal connection 282. In an example, the third processing unit 258 is configured to decode the instruction message, in particular to check whether the instruction message indicates an unauthorized use of the first identifier or whether the instruction message indicates a compromised device or node.

The third processing unit in 258 is configured, preferably if the instruction message is received and preferably if the instruction message also indicates an impermissible use of the first identifier (or the compromised device/node), to initiate a reachability test of the CAN devices 202, 230 coupled to the CAN BUS network 228. In an example, the third processing unit 258 is coupled to the third transmitter 256 via another signal connection 284. Via the signal connection 284, the third processing unit 258 can control the third transmitter 256.

To perform the reachability test, the third processing unit 258 may be configured to control the third transmitter 256 in response to the received instruction message such that a CAN BUS test signal 262 is generated by the third transmitter 256 at the third CAN BUS interface 252. The third transmitter 256 may be coupled to the third CAN BUS interface 252 via signal connections such that the CAN BUS test signal 262 generated by the third transmitter 256 is transmitted to each CAN device 202, 230 connected to the CAN BUS network 228 via the third CAN BUS interface 252 and the CAN BUS network 228.

In an example to perform the reachability test, the third processing unit 258 is configured to transmit a digital control signal to the third transmitter 256 via the signal connection 284. The digital control signal may represent a request message for sending a response message to the monitoring device 204. The third transmitter 256 may generate the CAN BUS test signal 262 based on the digital control signal.

In Summary, with the instruction message transmitted via the second CAN BUS signal 248 from the second CAN device 230 to the monitoring device 204, the monitoring device 204 receives the information to start the reachability test. For the reachability test, the monitoring device 204 sends the CAN BUS test signal 262 to each CAN device 202, 230 that is connected to the CAN BUS network 228.

The second CAN device 230 may respond to the CAN BUS test signal 262 with a response message. In an example, the second CAN device 230 may configure to respond to a received CAN BUS test signal 262 with the CAN BUS response signal 272 that directly or indirectly represents a reachability of the second CAN device 230.

Although the first CAN device 202 may receive the CAN BUS test signal 262 at least at the first CAN BUS interface 210 and which possibly forwards it to the first receiver 264 via the first control unit 212 and/or signal connections 266, the first interruption time 224 continues long enough, such that the first control unit 212 is configured to prevent a CAN BUS signal from being generated by the first CAN device 202 at the first CAN BUS interface 210 during the first interruption time 224. Therefore, the first CAN device 202 cannot send a CAN BUS response signal 272 representing a response message in response to the CAN BUS test signal 262 to the monitoring device 204. The monitoring device 204 may determine that the first CAN device 202 has not responded to the reachability test and is therefore most likely malicious and/or compromised.

In an example, the first interruption time 224 is predefined such that the CAN BUS test signal 262 may be transmitted during the first interruption time 224. In another example, the first interruption time 224 is further defined such that the response message, in particular represented by a CAN BUS response signal 272, can be transmitted during the first interruption time 224 from each CAN device 230, that is not malicious or compromised. For example, the first interruption time 224 may be predefined such that the first interruption time 224 is greater (preferably greater by at least 20%, greater by at least 50% greater, or greater by at least 100%) than a sum of processing times and transmission times for generating and transmitting the second CAN BUS signal 248, for generating and transmitting the CAN BUS test signal 262, and for generating and transmitting the CAN BUS response signal 272. In an example, the first interruption time 224 may therefore be predefined to ensure that all CAN devices 202, 230 connected to the CAN BUS network 228 can at least theoretically respond with a CAN BUS response signal 272 to a CAN BUS test signal 262.

In FIG. 3, the second CAN device 230 is schematically shown, wherein the second CAN device comprises the second processing unit 238. Such a processing unit may also be provided for the first CAN device 202, even though such a processing unit for the first CAN device 202 is not shown in FIG. 3. However, assuming such a processing unit may be provided for the first CAN device 202, the processing unit may not prevent the first control unit 212 from preventing a CAN BUS signal from being generated by the first CAN device 202 at the first CAN BUS interface 210 during the first interruption time 224.

In an example, each CAN device 202, 230 is configured, if the CAN BUS test signal 262 is received via the associated CAN BUS interface 210, 236 and the associated receiver 264, 234, to generate a digital RXD test signal based on the respective received CAN BUS test signal 262 at the associated receiver 264, 234. In an example, if the CAN BUS test signal 262 is received by the second CAN device 230 via the associated, second CAN BUS interface 236 and the associated, second receiver 234, the second receiver 234 may generate a digital RXD test signal based on the received CAN BUS test signal 262. In the example of FIG. 3, the digital RXD test signal may be forwarded to the second processing unit 238.

In an example, each CAN device 202, 230 is configured, if the RXD test signal is generated by the associated receiver 264, 234, to read out the request message represented by the RXD test signal 262, wherein the request message includes the request for sending a response message to the monitoring device 204. The processing unit 238 of the respective CAN device 202, 230 may be configured to read out the response message. In an example, if an RXD test signal is received by the second processing unit 238 of the second CAN device 230, the second processing unit 238 may be configured to decode the RXD test signal and read out the response message.

In an example, each CAN device 202, 230 may be configured, if it has read out the response message and if the transmitter 208, 232 of the respective CAN device 202, 230 is not disabled, to trigger the transmitter 208, 232 of the respective CAN device 202, 230 to generate a CAN BUS response signal 272, wherein the CAN BUS response signal 272 represents a response message that directly or indirectly indicates the respective CAN device 202, 230. The respective response message may thus indicate from which CAN device 202, 230 the respective response signal originates. However, it should be taken into account that, for example, the CAN device 202 comprises the first control unit 212 that prevents a CAN BUS signal from being generated by the first CAN device 202 at the first CAN BUS interface 210 during the first interruption time 224. Thus, it is theoretically possible that the first transmitter 208 of the first CAN device 202 generates a CAN BUS response signal, but the first control unit 212 prevents the CAN BUS response signal from reaching the first CAN BUS interface 210 during the first interruption time 224. In contrast, the second CAN device 230 may include an associated transmitter 232 that also generates a CAN BUS response signal 272 that is forwarded to the second CAN BUS interface 236 of the second CAN device 230 so that the CAN BUS response signal 272 will be sent from the second CAN device 230 to the monitoring device 204 via the CAN BUS network 228.

In an example, each CAN device 202, 230 is configured, if a signal connection 268, 292 between the associated transmitter 208, 232 and the associated CAN BUS interface 210, 236 is not interrupted or disabled, to transmit the CAN BUS response signal 272 generated by the associated transmitter 208, 232 via the associated CAN BUS interface 210, 236.

In an example, the monitoring device 204 is configured to receive the at least one CAN BUS response signal caused by the instruction message. The monitoring device 204 may be configured to receive multiple CAN BUS response signals 272 from different CAN devices 230 caused by the instruction message. Each CAN BUS response signal 272 may be routed through the third CAN BUS interface 252 and signal connections 302 to the third receiver 254, which generates an associated digital (third) RXD response signal for each received CAN BUS response signal. Each (third) RXD response signal is routed from the third receiver 254 to the third processing unit 258 via the signal connection 282. The third processing unit 258 may be configured to decode each (third) RXD response signal and to read out the associated response message. Each response message indicates a CAN device 230.

In an example, the third processing unit 258 of the monitoring device 204 may be configured to determine which CAN device 230 responded via a corresponding CAN BUS response signal 272 based on the read response messages. A list representing all CAN devices 202, 230 connected to the CAN BUS network 228 may be stored by the monitoring device 204, and preferably by the associated third processing unit 258. The list may be pre-defined and/or continuously updated by the third processing unit 258. In an example, the third processing unit 258 may listen to the CAN BUS signals on the CAN BUS network 258 via the third CAN BUS interface 252, the signal connections 302, and the third receiver 254, and based on the identifiers of the CAN BUS messages represented by the CAN BUS signals, create and/or update the list.

After the third processing unit 258 determines which of the CAN devices 230 has responded with a response message, the third processing unit 258 may determine based on the list and the response messages which of the CAN devices 202 has not responded with a response message. Any CAN device 202 that has not responded with a response message may be identified by the third processing unit 258 as a potential malicious device and/or a compromised device.

In an example, the third processing unit 258 is configured to identify a possible malicious CAN device 202, 230 based on the received response message and preferably also on the list of CAN devices connected to the CAN BUS network 228.

In an example, the first control unit 212 of the first CAN device 202 is configured to prevent CAN BUS signals from being received via the first CAN BUS interface 210 during the first interruption time 224. For example, the first control unit 212 may be coupled between the first CAN BUS interface 210 and the receiver 264, such that the first control unit 212 may prevent CAN BUS signals from being forwarded from the first CAN BUS interface 210 to the first receiver 264 during the first interruption time 224. In this case, for example, the CAN BUS test signal 262 cannot be forwarded to the first receiver 264. Due to the interruption of the forwarding of the CAN BUS test signal 262, no CAN BUS response signal 272 is generated by the first CAN device 202 during the first interruption time 224.

In an example, the first control unit 212 of the first device 202 may be configured to interrupt the at least one signal connection 266 between the first CAN BUS interface 210 and the first receiver 264 during the first interruption time 224. Previously, it was explained that the first control unit 212 may be coupled between the first CAN BUS interface 210 and the first receiver 264. However, this arrangement of the first control unit 212 is not mandatory. For example, the first control unit 212 may control an optional switch unit (not shown) integrated into the at least one signal connection 266 for interruption during the first interruption time 224. In this case, for example, the CAN BUS test signal 262 cannot be forwarded to the first receiver 264. Due to the interruption of the forwarding of the CAN BUS test signal 262, no CAN BUS response signal 272 is generated by the first CAN device 202 during the first interruption time 224.

In an example, the first control unit 212 of the first CAN device 202 is configured to disable the first receiver 264 during the first interruption time 224. Also in this case, it is not mandatory that the first control unit 212 needs to be coupled between the first CAN BUS interface 210 and the first receiver 264. Rather, a control line (not shown) may be provided through which the first control unit 212 may control the first receiver 264 to enable or disable the first receiver 264. In the disabled state, the first receiver 264 cannot decode a CAN BUS signal and thus cannot generate a digital signal at the output of the first receiver 264. Due to the deactivation of the first receiver 264 during the first interruption time 224, a CAN BUS response signal 272 will also not be generated by the first CAN device 202.

In an example, the first control unit 212 of the first CAN device 202 is configured to prevent transmission, in particular sending, of CAN BUS signals via the first CAN BUS interface 210 during the first interruption time 224. For example, the first control unit 212 may be configured to disable the first CAN BUS interface 210 during the first interruption time 224. This effectively prevents the first CAN device 202 from sending a CAN BUS response signal 272 over the CAN BUS network 228 during the first interruption time 224.

In an example, the first control unit 212 of the first CAN device 202 is configured to interrupt the at least one signal connection 268 between the first transmitter 208 and the first CAN BUS interface 210 during the first interruption time 224. Should the first transmitter 208 generate a CAN BUS response signal in response to a CAN BUS test signal 262, interrupting the at least one signal connection 268 between the transmitter 208 and the first CAN BUS interface 210 during the first interruption time 224 effectively prevents the CAN BUS response signal from reaching the first CAN BUS interface 210. In an example, the first control unit 212 may be coupled between the first transmitter 208 and the first CAN BUS interface 210 to enable the interruption of the at least one signal connection 286. In an example, the first control unit 212 may be integrated into the at least one signal connection 286 between the first transmitter 208 and the first CAN BUS interface 210.

In an example, the first control unit 212 is configured to disable the first transmitter 208 during the first interruption time 224. Again, it is not mandatory that the first control unit 212 be coupled between the first transmitter 208 and the first CAN BUS interface 210. Rather, a control line (not shown)

may be provided through which the first control unit 212 may control the first transmitter 208 to disable or enable the first transmitter 208. In the deactivated state, the first transmitter 208 cannot generate a CAN BUS signal, particularly the CAN BUS response signal 272. Due to the possible deactivation of the first transmitter 208 during the first interruption time 224, no CAN BUS response signal 272 will be generated by the first CAN device 202 either.

Figure 7:
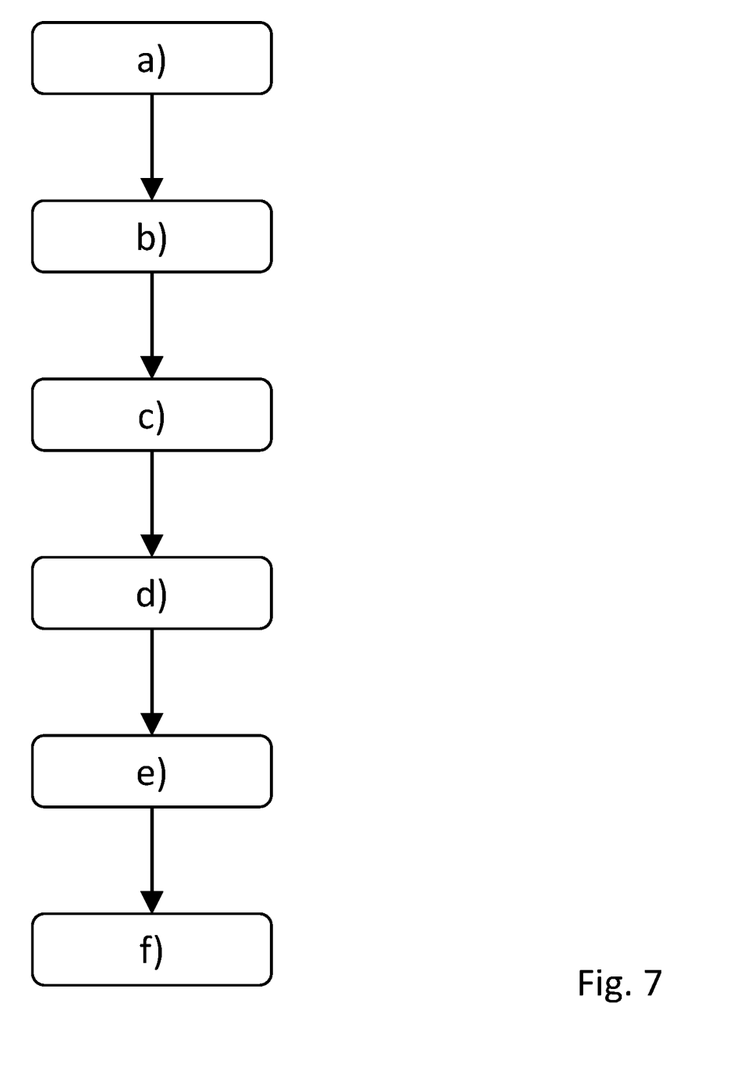
FIG. 7 shows a simplified flow chart.

FIG. 7 schematically illustrates an embodiment of the method according to the present disclosure. The method preferably relates to the use of the CAN system 200. The method comprises the steps of: a) the first control unit 212 reading out a first identifier from a first TXD message 216; b) comparing, as a first comparison, the first identifier with at least a first reference tag; c) the first transmitter 208 generating, via the first CAN BUS interface 210, a first CAN BUS signal 220 based on the first TXD message 216, such that the first CAN BUS signal 220 represents at least a first portion 222 of the first TXD message 216; d) both, invalidating a representation of the first TXD message 216 by the first CAN BUS signal 220 by means of the first control unit 212 and preventing the first CAN BUS signal 220 from being generated by the first CAN device 202 at the first CAN BUS interface 210 for a predetermined first interruption time 224 by means of the first control unit 212, if a result of the first comparison of step b) indicates that the first identifier does not correspond to one of the at least one first reference tag; e) receiving an instruction message over the CAN BUS network 228 at the monitoring device 204 from a second CAN device 230; and f) testing a reachability from the monitoring device 204 to each CAN device 202, 230 coupled to the CAN BUS network 228 in response to the received instruction signal. It shall be noted, that step a) may be carried out before step b), or vice versa.

For the method, the preferred explanations, preferred features, technical effects and benefits are referred to in an analogous manner as previously explained for the CAN system 200.

Although the described exemplary embodiments disclosed herein focus on devices, systems, and methods for using same, the present disclosure is not necessarily limited to the example embodiments illustrate herein. For example, various embodiments of providing The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A Controller Area Network (CAN) system comprising:
    a first CAN device, and
    a monitoring device,
    wherein the first CAN device comprises a first transmit data (TXD) interface, a first transmitter, a first CAN BUS interface, and a first control unit;
    wherein the first control unit is configured to read out a first identifier from a first TXD message and to compare, as a first comparison, the first identifier with at least one first reference tag;
    wherein the first CAN device is configured to generate a first CAN BUS signal based on the first TXD message via the first transmitter at the first CAN BUS interface, such that the first CAN BUS signal represents at least a first part of the first TXD message;
    wherein the first control unit is configured, if a result of the first comparison indicates that the first identifier does not correspond to any of the at least one first reference tag, to invalidate a representation of the first TXD message by the first CAN BUS signal and to prevent, for a predetermined first interruption time, a CAN BUS signal from being generated by the first CAN device at the first CAN BUS interface, and
    wherein the monitoring device is configured to receive an instruction message over a CAN BUS network from a second CAN device and to test for reachability to any CAN device coupled to the CAN BUS network in response to the instruction message.

2. The CAN system of claim 1, wherein the CAN system comprises the CAN BUS network.

3. The CAN system of claim 1, wherein the CAN system comprises the second CAN device.

4. The CAN system according to claim 3,
    wherein the second CAN device comprises a second transmitter, a second receiver, a second CAN BUS interface, and a second processing unit,
    wherein the second receiver is directly or indirectly coupled to the second CAN BUS interface to receive the first CAN BUS signal,
    wherein the second receiver is configured to transmit a second receive data (RXD) signal to the second processing unit based on the first CAN BUS signal, wherein the second RXD signal represents at least a first part of a second RXD message,
    wherein the first part of the second RXD message including the first identifier of the first TXD message,
    wherein the second processing unit is configured to read the first identifier from the first part of the second RXD message and, as a second comparison, to compare the first identifier with a second reference tag,
    wherein the second processing unit is further configured, if the result of the second comparison indicates that the first identifier corresponds to the second reference tag, to control the second transmitter to generate with the second transmitter a second CAN BUS signal representing the instruction message, which indicates an unpermitted use of the first identifier.

5. The CAN system according to claim 1, wherein the monitoring device is configured to test the reachability to any CAN device coupled to the CAN BUS network in response to the received instruction message only if the instruction message directly or indirectly represents an unpermitted use of an identifier and/or a compromised network device and/or a compromised network node.

6. The CAN system according to claim 1,
    wherein the monitoring device comprises a third CAN BUS interface, a third receiver, a third transmitter and a third processing unit,
    wherein the third receiver is directly or indirectly coupled to the third CAN BUS interface to receive the second CAN BUS signal,
    wherein the third receiver is further configured to transmit a third RXD signal to the third processing unit based on the second CAN BUS signal, the third RXD signal representing the instruction message,
    wherein the third processing unit is configured to initiate a reachability test of the CAN devices coupled to the CAN BUS network by controlling the third transmitter in response to the received instruction message such that a CAN BUS test signal is generated by the third transmitter at the third CAN BUS interface for each CAN device, wherein each CAN BUS test signal represents a request for sending of a response message to the monitoring device.

7. The CAN system according to claim 6, wherein the first control unit of the first CAN device is configured to prevent reception of CAN BUS signals via the first CAN BUS interface during the first interruption time.

8. The CAN system according to claim 7, wherein the first control unit of the first CAN device is configured to interrupt a signal connection between the first CAN BUS interface and a first receiver of the first CAN device during the first interruption time.

9. The CAN system of claim 8, wherein the first control unit of the first CAN device is configured to disable the first receiver during the first interruption time.

10. The CAN system according to claim 6, wherein the first control unit of the first CAN device is configured to prevent transmission of CAN BUS signals via the first CAN BUS interface during the first interruption time.

11. The CAN system according to claim 10, wherein the first control unit is configured to interrupt a signal connection between the first transmitter and the first CAN BUS interface during the first interruption time.

12. The CAN system according to claim 10, wherein the first control unit is configured to disable the first transmitter during the first interruption time.

13. The CAN system according to claim 6, wherein the first interruption time is predefined to send the CAN BUS test signal and/or response messages during the first interruption time.

14. The CAN system according to claim 6,
    wherein each CAN device is configured, if the CAN BUS test signal is received via an associated CAN BUS interface and an associated receiver, to generate a digital RXD test signal based on the CAN BUS test signal at the associated receiver;
    wherein each CAN device is configured, if the RXD test signal is generated by the associated receiver, to read out the response request;

wherein each CAN device is configured, if the response request is read out and if the transmitter of the respective CAN device is not disabled, to drive the transmitter for generating a CAN BUS response signal representing a response message that directly or indirectly indicates the respective CAN device;

wherein each CAN device is configured, if a signal connection between an associated transmitter and the associated CAN BUS interface is not interrupted, to transmit the CAN BUS response signal generated by the associated transmitter via the associated CAN BUS interface;

wherein the monitoring device is configured to receive the CAN BUS response signals caused by the instruction message resulting in a digital RXD response signal representing the response messages; and wherein the third processing unit is configured to identify a malicious CAN device based on the received response messages.

15. A method for a Controller Area Network (CAN) system comprising a first CAN device, and a monitoring device, wherein the first CAN device comprises a first transmit data (TXD) interface, a first transmitter, a first CAN BUS interface, and a first control unit, and wherein the method comprises the steps of:

a) the first control unit reading out a first identifier from a first TXD message;

b) comparing, as a first comparison, the first identifier with at least a first reference tag;

c) the first transmitter generating, via the first CAN BUS interface, a first CAN BUS signal based on the first TXD message, such that the first CAN BUS signal represents at least a first portion of the first TXD message;

d) both, invalidating a representation of the first TXD message by the first CAN BUS signal by the first control unit and preventing the first CAN BUS signal from being generated by the first CAN device at the first CAN BUS interface for a predetermined first interruption time by the first control unit, if a result of the first comparison of step b) indicates that the first identifier does not correspond to at least the first reference tag;

e) receiving an instruction message over a CAN BUS network at the monitoring device from a second CAN device; and f) testing a reachability from the monitoring device to each CAN device coupled to the CAN BUS network in response to the received instruction signal.

16. The method according to claim 15, wherein the CAN system comprises the second CAN device, wherein the second CAN device comprises a second transmitter, a second receiver, a second CAN BUS interface, and a second processing unit, wherein the second receiver is directly or indirectly coupled to the second CAN BUS interface to receive the first CAN BUS signal, and wherein the method comprises the following further steps:

the second receiver transmitting a second receive data (RXD) signal to the second processing unit based on the first CAN BUS signal, wherein the second RXD signal represents at least a first part of a second RXD message, wherein the first part of the second RXD message including the first identifier of the first TXD message;

the second processing unit reading the first identifier from the first part of the second RXD message and, as a second comparison, comparing the first identifier with a second reference tag; and the second processing unit, if the result of the second comparison indicates that the first identifier corresponds to the second reference tag, controlling the second transmitter to generate with the second transmitter a second CAN BUS signal representing the instruction message, which indicates an unpermitted use of the first identifier.

17. The method according to claim 16, wherein the method comprising the following further step:

the monitoring device testing the reachability to any CAN device coupled to the CAN BUS network in response to the received instruction message only if the instruction message directly or indirectly represents an unpermitted use of an identifier and/or a compromised network device and/or a compromised network node.

18. The method according to claim 16, wherein the monitoring device comprises a third CAN BUS interface, a third receiver, a third transmitter and a third processing unit, wherein the third receiver is directly or indirectly coupled to the third CAN BUS interface to receive the second CAN BUS signal, and wherein the method comprising the following further steps:

the third receiver transmitting a third RXD signal to the third processing unit based on the second CAN BUS signal, the third RXD signal representing the instruction message, the third processing unit initiating a reachability test of the CAN devices coupled to the CAN BUS network by controlling the third transmitter in response to the received instruction message such that a CAN BUS test signal is generated by the third transmitter at the third CAN BUS interface for each CAN device, wherein each CAN BUS test signal represents a request for sending of a response message to the monitoring device.

19. The method according to claim 15, wherein the method comprising the following further step:

the first control unit of the first CAN device preventing reception of CAN BUS signals via the first CAN BUS interface during the first interruption time.

20. The method according to claim 15, wherein the method comprising the following further steps:

the first control unit of the first CAN device interrupting a signal connection between the first CAN BUS interface and a first receiver of the first CAN device during the first interruption time.

* * * * *